US012601110B2

(12) United States Patent (10) Patent No.: US 12,601,110 B2
Wever (45) Date of Patent: Apr. 14, 2026

(54) CARPET BACKING COMPRISING NATURAL COMPOUNDS

(71) Applicant: INTERFACE EUROPEAN MANUFACTURING B.V., Scherpenzeel (NL)

(72) Inventor: Johannes Lieuwe Wever, Apeldoorn (NL)

(73) Assignee: Interface European Manufacturing B.V., Scherpenzeel (NL)

( * ) Notice: Subject to any disclaimer, the term of this patent is extended or adjusted under 35 U.S.C. 154(b) by 0 days.

(21) Appl. No.: 17/477,414

(22) Filed: Sep. 16, 2021

(65) Prior Publication Data

US 2022/0002939 A1 Jan. 6, 2022

Related U.S. Application Data

(63) Continuation of application No. 16/315,176, filed as application No. PCT/NL2017/050442 on Jul. 4, 2017, now abandoned.

(30) Foreign Application Priority Data

Jul. 4, 2016 (NL) ...................................... 2017096

(51) Int. Cl.
| | |
|---|---|
| *D06N 7/00* | (2006.01) |
| *C08K 3/34* | (2006.01) |
| *C08K 3/36* | (2006.01) |
| *C08L 93/04* | (2006.01) |
| *C08K 3/26* | (2006.01) |

(52) U.S. Cl.
CPC ........... *D06N 7/0076* (2013.01); *C08K 3/346* (2013.01); *C08K 3/36* (2013.01); *C08L 93/04* (2013.01); *D06N 7/0071* (2013.01); C08K 2003/265 (2013.01); C08L 2207/04 (2013.01); D06N 2203/02 (2013.01); D06N 2203/042 (2013.01); D06N 2203/047 (2013.01); D06N 2203/061 (2013.01); D06N 2213/066 (2013.01)

(58) Field of Classification Search
CPC .. D06N 7/0073; D06N 7/0076; D06N 7/0078; D06N 2203/02; D06N 7/0071–0086; Y10T 428/23993; Y10T 428/23979; C08L 93/04
See application file for complete search history.

(56) References Cited

U.S. PATENT DOCUMENTS

| | | | |
|---|---|---|---|
| 4,192,788 A | 3/1980 | Dodson | |
| 4,430,468 A | * 2/1984 | Schumacher | ........ D06N 7/0076 |
| | | | 524/427 |
| 4,443,575 A | 4/1984 | Iwai et al. | |
| 4,634,730 A | 1/1987 | Bogdany | |
| 4,640,953 A | 2/1987 | Goss | |
| 5,080,978 A | 1/1992 | Kulzick et al. | |
| 5,525,426 A | 6/1996 | Kulzick et al. | |
| 5,565,511 A | 10/1996 | Braud et al. | |
| 6,075,078 A | 6/2000 | Braud et al. | |
| 6,248,834 B1 | 6/2001 | Mori | |
| 6,890,982 B2 | 5/2005 | Borsinger et al. | |
| 7,288,590 B2 | 10/2007 | Lechat et al. | |
| 8,895,643 B2 | 11/2014 | Combs et al. | |
| 9,409,381 B2 | 8/2016 | Chang | |
| 9,637,615 B2 | 5/2017 | Fini | |
| 9,885,149 B2 | 2/2018 | Weeks et al. | |
| 9,945,071 B2 | 4/2018 | Wright et al. | |
| 10,071,335 B2 | 9/2018 | Lee | |
| 10,077,356 B2 | 9/2018 | Fini | |
| 10,301,228 B2 | 5/2019 | Bontchev et al. | |
| 10,323,164 B2 | 6/2019 | Nakatani et al. | |
| 10,920,370 B2 | 2/2021 | Wever et al. | |
| 2002/0060445 A1 | 5/2002 | Shirk et al. | |
| 2003/0119974 A1 | 6/2003 | Parikh et al. | |
| 2004/0191468 A1 | 9/2004 | Lattime et al. | |
| 2006/0080935 A1 | 4/2006 | Ddamulira et al. | |
| 2006/0134374 A1 | 6/2006 | Bell et al. | |
| 2006/0260253 A1 | 11/2006 | Brice | |
| 2007/0043128 A1 | 2/2007 | Jenkines et al. | |
| 2007/0082172 A1 | 4/2007 | Derbyshire et al. | |
| 2007/0275207 A1 | 11/2007 | Higgins et al. | |
| 2008/0064852 A1 * | 3/2008 | Ddamulira | ............. C09J 167/04 |
| | | | 530/200 |
| 2009/0023836 A1 | 1/2009 | Nascimento et al. | |
| 2009/0249645 A1 | 10/2009 | Kajihara et al. | |

(Continued)

FOREIGN PATENT DOCUMENTS

| | | |
|---|---|---|
| CN | 2777110 | 5/2006 |
| CN | 101424121 | 5/2009 |

(Continued)

OTHER PUBLICATIONS

Application No. JP2018-567897 , Office Action, Mailed on Apr. 11, 2022, 7 pages.

(Continued)

*Primary Examiner* — Larissa Rowe Emrich

(74) *Attorney, Agent, or Firm* — Kilpatrick Townsend & Stockton LLP

(57) ABSTRACT

A carpet or carpet tile comprising a biobased backing is provided. The resultant carpet tile has advantages in terms of environmental issues and reduces the need for fossil fuels. The backing is made using a backing composition comprising a resin, an oil, optionally a thermoplastic elastomer, and a filler material.

11 Claims, No Drawings

(56) References Cited

U.S. PATENT DOCUMENTS

| | | | |
|---|---|---|---|
| 2010/0069589 A1* | 3/2010 | Bradin | C08F 210/16 |
| | | | 526/170 |
| 2010/0285246 A1 | 11/2010 | Becker et al. | |
| 2011/0008567 A1 | 1/2011 | Weeks et al. | |
| 2011/0189427 A1 | 8/2011 | Wells et al. | |
| 2012/0071597 A1 | 3/2012 | Aerts et al. | |
| 2013/0203953 A1* | 8/2013 | Pereira | C25B 3/23 |
| | | | 585/16 |
| 2013/0295371 A1 | 11/2013 | Peterson et al. | |
| 2014/0083331 A1 | 3/2014 | Fini | |
| 2015/0274931 A1 | 10/2015 | Chen et al. | |
| 2015/0354143 A1 | 12/2015 | Pike | |
| 2016/0068659 A1 | 3/2016 | Moutinho et al. | |
| 2016/0108573 A1 | 4/2016 | Tichelaar et al. | |
| 2016/0134374 A1 | 5/2016 | Hu et al. | |
| 2016/0289512 A1 | 10/2016 | Bauers et al. | |
| 2017/0152417 A1 | 6/2017 | Tichelaar et al. | |
| 2017/0260371 A1 | 9/2017 | Fini | |
| 2018/0066087 A1 | 3/2018 | Mohanty et al. | |
| 2018/0094138 A1 | 4/2018 | Aerts et al. | |
| 2018/0305621 A1 | 10/2018 | Weaver et al. | |
| 2019/0078285 A1 | 3/2019 | Banuelos et al. | |
| 2020/0181440 A1 | 6/2020 | Bastin | |
| 2020/0217012 A1* | 7/2020 | Wever | D06N 3/123 |

FOREIGN PATENT DOCUMENTS

| | | | |
|---|---|---|---|
| CN | 102575418 | | 7/2012 |
| CN | 102770051 | | 11/2012 |
| CN | 203201096 | | 9/2013 |
| CN | 104962218 | A | 10/2015 |
| CN | 105694510 | | 6/2016 |
| CN | 205276789 | | 6/2016 |
| CN | 107536406 | | 1/2018 |
| CN | 107660965 | | 2/2018 |
| CN | 107660971 | | 2/2018 |
| CN | 107660972 | | 2/2018 |
| CN | 107660973 | | 2/2018 |
| CN | 207345209 | | 5/2018 |
| CN | 207449260 | | 6/2018 |
| DE | 3406289 | A1 | 9/1985 |
| EP | 0369644 | A2 | 5/1990 |
| EP | 0408386 | A1 | 1/1991 |
| EP | 0879805 | B1 | 2/2002 |
| EP | 2506742 | | 3/2015 |
| EP | 3862183 | A1 | 8/2021 |
| FR | 2702183 | | 9/1994 |
| GB | 1443337 | A | 7/1976 |
| JP | 6045688 | A | 3/1985 |
| JP | 61285235 | | 12/1986 |
| JP | 01272878 | A | 10/1989 |
| JP | 05132870 | A | 5/1993 |
| JP | 08105177 | A | 4/1996 |
| JP | 2613091 | B2 | 5/1997 |
| JP | 3535715 | | 11/1997 |
| JP | 10237999 | | 9/1998 |
| JP | 11229219 | | 8/1999 |
| JP | 2000144949 | | 5/2000 |
| JP | 2000144950 | | 5/2000 |
| JP | 2000192568 | | 7/2000 |
| JP | 2001064898 | | 3/2001 |
| JP | 2005198684 | | 7/2005 |
| JP | 2012532676 | | 12/2012 |
| JP | 2013512052 | | 4/2013 |
| JP | 2014028092 | | 2/2014 |
| JP | 2014189656 | A | 10/2014 |
| KR | 20000013937 | | 3/2000 |
| KR | 20010010520 | | 2/2001 |
| KR | 100370297 | | 1/2003 |
| KR | 20030043260 | | 6/2003 |
| KR | 20040067736 | | 7/2004 |
| KR | 200391712 | | 8/2005 |
| KR | 100524171 | | 2/2006 |
| KR | 100554665 | | 2/2006 |
| KR | 200421812 | | 7/2006 |
| KR | 100889879 | | 3/2009 |
| KR | 100894718 | | 4/2009 |
| KR | 100972090 | | 7/2010 |
| KR | 20100114568 | | 10/2010 |
| KR | 20110067344 | | 6/2011 |
| KR | 101149743 | | 6/2012 |
| KR | 101497426 | | 3/2015 |
| KR | 101649963 | | 8/2016 |
| KR | 20160096837 | | 8/2016 |
| KR | 20160100663 | | 8/2016 |
| KR | 20160133124 | | 11/2016 |
| KR | 20170060776 | | 6/2017 |
| WO | 9307790 | A1 | 4/1993 |
| WO | 2009134403 | A1 | 11/2009 |
| WO | 2011005828 | | 1/2011 |
| WO | WO-2013163230 | A2 * | 10/2013 ... C12P 7/06 |
| WO | 2014006062 | A1 | 1/2014 |
| WO | 2014096336 | A1 | 6/2014 |
| WO | 2014152291 | | 9/2014 |
| WO | 2018009060 | | 1/2018 |

OTHER PUBLICATIONS

"Safety Data Sheet for Sunflower Oil (High Oleic)", Essential Ingredients, Jun. 13, 2019, 9 pages.

"Safety Data Sheet for Sylvalite RE 88F", Arizona Chemical, Jan. 29, 2015, 8 pages.

U.S. Appl. No. 16/315,176 , Non-Final Office Action, Mailed on Aug. 11, 2020, 11 pages.

U.S. Appl. No. 16/315,176 , Non-Final Office Action, Mailed on Apr. 28, 2020, 12 pages.

U.S. Appl. No. 16/315,176 , Non-Final Office Action, Mailed on Aug. 21, 2019, 13 pages.

U.S. Appl. No. 16/315,176 , Non-Final Office Action, Mailed on Feb. 10, 2021, 15 pages.

U.S. Appl. No. 16/315,176 , "U.S. Appl. No.", Carpet Backing Comprising Natural Compounds, filed Jan. 4, 2019, 15 pages.

U.S. Appl. No. 16/739,078 , Final Office Action, Mailed on Aug. 10, 2020, 10 pages.

U.S. Appl. No. 16/739,078 , Non-Final Office Action, Mailed on Apr. 8, 2020, 9 pages.

U.S. Appl. No. 16/739,078 , Notice of Allowance, Mailed on Oct. 21, 2020, 6 pages.

U.S. Appl. No. 17/103,673 , Advisory Action, Mailed on Aug. 9, 2021, 3 pages.

U.S. Appl. No. 17/103,673 , Final Office Action, Mailed on May 25, 2021, 10 pages.

U.S. Appl. No. 17/103,673 , Non-Final Office Action, Mailed on Feb. 5, 2021, 9 pages.

AU2017293297 , "First Examination Report", Feb. 3, 2021, 4 pages.

AU2017293297 , "Notice of Acceptance", Aug. 30, 2021, 3 pages.

Application No. CN201780041876.2 , Office Action, Mailed on Aug. 12, 2019, 10 pages.

Application No. CN201780041876.2 , Office Action, Mailed on Aug. 5, 2020, 10 pages.

Application No. CN201780041876.2 , Office Action, Mailed on Aug. 5, 2020, 7 pages.

Application No. CN201780041876.2 , Office Action, Mailed on Mar. 30, 2020, 7 pages.

Application No. CN201780041876.2 , Office Action, Mailed on Aug. 12, 2019, 8 pages.

Application No. CN201780041876.2 , Office Action, Mailed on Mar. 30, 2020, 9 pages.

Cooper "Aries Green(TM) Biochar Launches Retail Sales", Available Online at: https://www.businesswire.com/news/home/20190717005742/en/Aries-GREEN%E2%84%A2-Biochar-Launches-Retail-Sales, Jul. 17, 2019, 5 pages.

Deweerdt , "The Rise of the Carbon-Negative Building", Available Online at: https://www.anthropocenemagazine.org/2020/11/the-rise-of-the-carbon-negative-building/, Nov. 17, 2020, 9 pages.

Application No. EP17737911.2 , Notice of Decision to Grant, Mailed on Mar. 12, 2020, 2 pages.

(56)          References Cited

OTHER PUBLICATIONS

Application No. JP2018-567897 , Office Action, Mailed on Aug. 2, 2021, 12 pages.

U.S. Appl. No. 17/103,673 , Non-Final Office Action, Mailed on May 2, 2023, 11 pages.

U.S. Appl. No. 17/103,673 , Notice of Allowance, Mailed on Aug. 16, 2023, 5 pages.

Application No. CN202110452746.6 , Office Action, Mailed on Jun. 26, 2023, 6 pages.

Application No. JP2018-567897 , Office Action, Mailed on Feb. 13, 2023, 7 pages.

"Comparison of European Biochar Certificate Version 4.8 and IBI Biochar Standards Version 2.0", Oct. 2014, 5 pages.

Alhashimi , et al., "Life Cycle Environmental and Economic Performance of Biochar Compared with Activated Carbon: A Meta-Analysis", Resources, Conservation and Recycling, vol. 118, Mar. 2017, pp. 13-26.

Bates , et al., "Burn: Using Fire to Cool the Earth", Chelsea Green Publishing, Feb. 26, 2019, 57 pages.

Belletti , et al., "Experimental Research on Mechanical Properties of Biochar-Added Cementitious Mortars", Proceedings of the fib Symposium 2019 on Concrete—Innovations in Materials, Design and Structures, May 27-29, 2019, 10 pages.

CN201780041876.2 , "Office Action", Jan. 19, 2021, 27 pages.

Gu , et al., "Life Cycle Assessment of Activated Carbon from Woody Biomass", Wood and Fiber Science, vol. 50, No. 3, 2018, pp. 229-243.

Hagemann , et al., "Activated Carbon, Biochar and Charcoal: Linkages and Synergies Across Pyrogenic Carbon's ABCs", Water, vol. 10, No. 182, 2018, 19 pages.

McLaughlin , "An Overview of the current Biochar and Activated Carbon Markets", Available Online at: https://www.biofuelsdigest.com/bdigest/2016/10/11/an-overview-of-the-current-biochar-and-activated-carbon-markets/, Oct. 11, 2016, 4 pages.

NL2017096 , "Search Report", Mar. 7, 2017, 10 pages.

PCT/NL2017/050442 , "International Preliminary Report on Patentability", Jan. 17, 2019, 8 pages.

PCT/NL2017/050442 , "International Search Report and Written Opinion", Sep. 19, 2017, 9 pages.

PCT/US2020/012993 , "International Search Report and Written Opinion", Apr. 14, 2020, 14 pages.

PCT/US2020/012993 , "Written Opinion", Feb. 8, 2021, 8 pages.

Hutley, et al., "Polyolefins—The History and Economic Impact", Polyolefin Compounds and Materials., Dec. 24, 2015, Abstract.

Baron, et al., International Union of Pure and Applied Chemistry (IUPAC) Glossary of Class Names of Polymers Based on Chemical Structure and Molecular Architecture (IUPAC Recommendations 2009), Pure Appl. Chem., vol. 81, No. 6,2009, pp. 1131-1186.

Standard Terminology Relating to Plastics, ASTM International D883-17, Aug. 2017, 16 pages.

* cited by examiner

CARPET BACKING COMPRISING NATURAL COMPOUNDS

CROSS-REFERENCE TO RELATED APPLICATIONS

This application is a continuation of U.S. patent application Ser. No. 16/315,176 filed on Jan. 4, 2019, which is a U.S. national stage application under 35 U.S.C § 371 of PCT/NL2017/050442 filed on Jul. 4, 2017, which claims the benefit of NL Application No. 2017096 filed with The Netherlands Patent Office on Jul. 4, 2016, the disclosures of each of which are hereby incorporated by reference in their entireties.

FIELD OF THE INVENTION

The present invention is in the field of textile floor covering material, in particular of carpet and carpet tiles.

BACKGROUND OF THE INVENTION

Carpet and carpet tiles typically are made up of a textile top cloth, a precoat layer and a backing layer on the back. The textile top cloth is most commonly produced with a tufting, weaving or needlefelt process. In the tufting process, the carpet yarn is needled into a primary backing. In the weaving process, two sets of carpet yarns are interlaced at right angles. In the needlefelt process carpet fibers are needled into each other, possibly using a scrim for processing and/or re-inforcement. The yarns and fibers may be composed of natural and/or synthetic materials.

The textile top cloth may be precoated at the back thereof with a water based filled or unfilled latex called the precoating composition. The yarns or fibers are firmly connected to the precoating composition, providing a good bonding force. An alternative for a water based precoating composition can, for example, be a filled or unfilled hot melt composition. Another alternative could be melting the yarn or fibers together at the back of the top cloth.

Herein, the precoated top cloth is the intermediate product that is produced by precoating the top cloth or melting the yarn or fibers together at the back of the top cloth. Herein, the precoating layer is the layer that contains the precoating composition or the molten yarns or molten fibers.

The backing of a broadloom carpet normally consists of a second latex coating and a secondary backing which is often a woven substrate. The backing of a carpet tile is usually heavier, because it is essential to the performance and durability of the product. It enables heavy wear without deterioration. The backing provides flatness, dimensional stability, stiffness, and weight thereby minimizing or eliminating the need for adhesives. The backing of a carpet tile normally consists of a filled backing composition with, optionally, a glass veil or glass scrim for dimensional stability and/or, optionally, a nonwoven as covering fleece.

Commonly used backing compositions for carpet tiles are fossil fuel based, e.g., they comprise bitumen, PVC or Polyolefins. Although fossil fuels are continually being formed via natural processes, they are generally considered to be non-renewable resources because they take millions of years to form and the known viable reserves are being depleted much faster than new ones are being made. Additionally, the use of fossil fuels raises potential environmental concerns, as the burning thereof results in the formation of carbon dioxide, which is a notorious greenhouse gas. Moreover, emissions of volatile organic compounds (VOCs) from carpets have been widely recognized as an indoor air quality problem that may affect human health. VOCs not only derive from carpets and carpet tiles themselves, but also from adhesives used to secure the carpet or carpet tile to a floor surface. Also the materials used in the carpet should not contain toxic components that could be harmful during production, installation, use, maintenance and end-of-life applications. Specific toxicity issues of the currently used fossil fuel based backing materials are the presence of toxic PAH's (polycyclic aromatic hydrocarbons) present in bitumen and the presence of plasticizers and the formation of toxic components in flue gases after incineration for PVC and the presence of monomers for polyolefins.

US 2006/0134374 describes a carpet backing, which is made using glass powder manufactured from recycled post-consumer glass. It comprises a filled hot melt comprising 12-20 wt. % of an ethylene vinyl acetate (EVA) polymer, 0-55 wt. % of a glass filler, and 20-40 wt. % resin. The amount of filler that can be incorporated in this carpet backing is relatively low. Also, the amount of the non-biobased EVA hotmelt is relatively high thereby compromising the sustainability of the carpet backing. EVA has a higher environmental impact than rosin (including derivatives thereof) because more energy is needed to produce the polymer.

US2011/0189427 is concerned with providing a carpet tile which is lighter than previous carpet tile constructions, and which makes use of more environmentally friendly materials. It describes a carpet backing comprising 25 wt. % polyvinyl chloride copolymer and homopolymer, 53.8 wt. % recycled glass, and 21% of a mix of epoxidised soy bean oil with an acetic acid of castor bean oil. The amount of filler that can be incorporated in this carpet backing is relatively low. Additionally, such carpet backing is not provided in a fully bio-based form. The backing uses a relatively high percentage of non-biobased polyvinyl chloride (PVC) thereby compromising the sustainability of the carpet tile. PVC has a higher environmental impact than rosin (including derivatives thereof) because more energy is needed to produce the polymer. Also, the amount of filler that can be incorporated in this carpet backing is relatively low.

U.S. Pat. No. 4,206,007 describes a carpet backing comprising 15-19 wt. % styrene-butadiene rubber, 0.8-5 wt. % saponified tall oil pitch, and 80 wt. % filler. The styrene-butadiene rubber is not bio-based. As such, sustainability of this carpet backing is compromised. Styrene butadiene rubber has a higher environmental impact than rosin (including derivatives thereof) because more energy is needed to produce the polymer. Also the backing consists of a styrene butadiene rubber latex, which is a dispersion in water. This requires a lot of heating energy during carpet production to evaporate the water and is therefore less sustainable.

U.S. Pat. No. 4,443,575 discloses a carpet or a carpet tile with a backing layer which comprises:

5-65%, preferably 10-40% by weight of an olefin-polar monomer copolymer preferably being an ethylene-vinyl acetate copolymer (EVA);

a synthetic oil consisting of one or more members selected from the group of non-condensed tricyclic aromatic hydrocarbon compounds which have a boiling point of 250° C. or higher and a molecular weight of 258 to 482, and which are liquid at room temperature, in an amount of 1 to 50% by weight;

an inorganic filler in an amount of 30 to 90% by weight;

and a solid, low molecular compound component in an amount up to 50%.

US20110008567 discloses a carpet or a carpet tile wherein the precoat layer or the adhesive backing layer comprises at least one non-chlorinated, non-polyvinyl butyral thermoplastic polymer which may be an ethylene/vinyl acetate (EVA) polymer, at least one filler which may be $CaCO_3$ in an amount up to 90% by weight, optionally at least one oil, preferably paraffinic oil, and 0 to 15% by weight of a tackifier.

FR2702183 discloses an adhesive-bonded floor mat of the type consisting of a substrate (2) made of synthetic fibers, woven or not, characterized in that it comprises on its lower surface, over its entire surface and from the inside to the outside a primary layer (3), and an adhesion layer (4) composed of a dispersion of a copolymer of styrene and carboxylated butadiene and natural latex in an ester of rosin and hydrocarbon resins, which layer has a tack having a value of between 8 and 10 cm under the ASTM measurement conditions and a peel force of the order of 500 $g/cm^2$.

It is an object of the present invention to provide a carpet or carpet tile that reduces the need for fossil fuels and/or reduces the emission of greenhouse gases. Additionally or alternatively, there is a need for carpets or carpet tiles that are low on VOCs and/or do not contain toxic components. Additionally or alternatively, there is a need for carpets or carpet tiles that are more bio-based and/or more environmentally sustainable, i.e., have a lower environmental impact. Additionally or alternatively, there is a need for carpets or carpet tiles, preferably fully bio-based carpets or carpet tiles, that can be more economically produced.

SUMMARY OF THE INVENTION

In a first aspect, the present invention relates to a carpet or carpet tile comprising a textile top cloth, a precoating layer and a backing layer, wherein said backing layer comprises a backing composition, wherein said backing composition comprises:
  a resin, preferably a rosin or rosin derivative;
  an oil, preferably of natural origin;
  optionally, a thermoplastic elastomer; and
  a filler.

In an embodiment, backing composition as taught herein may comprise:
  from about 5% to about 50% (w/w) resin, preferably a rosin or rosin derivative;
  from about 0.1% to about 20% (w/w) oil, preferably of natural origin;
  from about 0% to about 10% (w/w) thermoplastic elastomer; and
  from about 50% to about 95% (w/w) filler.

In an embodiment, the backing composition as taught herein has a Ring and Ball softening point as determined using the method described in EN1427:2007 in the range of 60-180° C. and/or a needle penetration at 25° C. as determined using the method described in EN1426:2007 in the range of 0.2-200×0.1 mm.

In a preferred embodiment, the resin is a natural resin, which is preferably selected from rosin or derivatives thereof, such as esterified rosin, hydrogenated rosin, phenolic rosin, terpenic rosin, and the like.

In a preferred embodiment, the oil is a natural oil, preferably a vegetable oil, more preferably a refined or modified vegetable oil, and even more preferably selected from the group consisting of rapeseed oil, refined rapeseed oil, sunflower oil, refined sunflower oil and refined high oleic sunflower oil. The natural oil can be plant, animal, and/or algae derived or obtained therefrom (non fossil). This in contrast to synthetic oils which are (artificially/intentionally) built from (simpler) substances to give the properties required.

In an embodiment, the backing composition may comprise from about 0.1% to about 5% (w/w) of the thermoplastic elastomer.

In an embodiment, the thermoplastic elastomer is a copolymer of ethylene and vinyl acetate.

In an embodiment, the thermoplastic elastomer is a block copolymer of polystyrene and polybutadiene (SBS).

In an embodiment, the thermoplastic elastomer is a polyolefin polymer.

In an embodiment, the thermoplastic elastomer is a polyhydroxyalkanoate polymer.

In an embodiment, the filler may be selected from calcium carbonate (limestone), silicates, silicas, oxides of silica, carbonates, sulfates, oxides of antimony, aluminium trihydrate, carbon black, talcum, clays, kaolin, and organic fillers like wood chips, wood flour, shell flour, plant material, like plant fibers, plant shells and plant residues and recycled materials like recycled rubber, recycled plastic, and recycled fibers.

In a preferred embodiment, the filler is limestone, preferably recycled limestone.

In an embodiment, the backing composition may further comprise between 0 and 2% (w/w) of an anti-oxidant.

In an embodiment, the carpet or carpet tile as taught herein may be essentially free of bitumen.

In an embodiment, the carpet or carpet tile as taught herein may be essentially free of a hydrocarbon wax.

In a second aspect, the present invention relates to a method for preparing the carpet or carpet tile as taught herein, said method comprising the steps of:
  providing a precoated top cloth comprising a top side comprising yarn or fibers and a back side comprising a precoating layer;
  preparing a backing composition as taught herein; and
  applying said backing composition onto said precoating layer.

DETAILED DESCRIPTION OF THE INVENTION

The invention relates to a carpet or carpet tile comprising a top cloth, a precoating layer and a backing layer, wherein said backing layer comprises a backing composition, wherein said backing composition comprises (1) a resin, preferably a rosin or a rosin derivative; (2) oil, preferably an oil of natural origin; (3) optionally, a thermoplastic elastomer; and (4) a filler.

In a carpet or carpet tile, the textile top cloth is most commonly produced by a tufting-, weaving- or needlefelt process. A precoating layer, which is often adhesive, may then be applied onto the back side (non-decorative side) of the textile top cloth, to securely fasten the yarn or fibers together in the textile top cloth. This precoating layer makes sure that the yarn filaments or fibers are bound together in the top cloth. The resulting precoated top cloth comprises the yarn or fibers at its top side, and the precoating layer at its back. A backing layer may subsequently be applied onto the precoating layer to increase flatness, to provide dimensional stability, stiffness, and weight, and to minimize the need for adhesives for installation. Other layers such as a glass veil or glass scrim for dimensional stability and/or nonwoven covering fleece may be incorporated to make up the carpet or carpet tile, but in the context of the present invention, these layers are not essential.

The components of the backing composition excluding the filler material constitute the "binder". The binder in the carpet or carpet tile backing composition preferably comprises at least 75%, preferably at least 80%, preferably at least 85%, more preferably at least 90%, yet more preferably at least 95% bio-based materials, and is preferably fully bio-based. The term "bio-based" as used herein refers to a material intentionally made from substances derived from currently living organisms, as opposed to non-renewable fossil fuels that are made from prehistoric organisms.

Suitable resins are normally in solid form at room temperature. The resins ideally have a melting point between about 65° C. and about 160° C., preferably between about 80° C. and 120° C. to allow the resin to be handled at room temperature and allowing the mixing and application process to be at reasonable processing temperatures.

The resin as used in the context of the present invention may be a natural or a synthetic resin. The resin is preferably a natural resin, and is more preferably a rosin, i.e., unmodified rosin or a rosin derived from rosin (i.e., a rosin derivative) by modification thereof. Rosin is a resin obtained from pines and some other plants, mostly conifers. It is semi-transparent and varies in color from yellow to black. At room temperature rosin is brittle, but it melts at stove-top temperatures. It chiefly consists of various resin acids. The rosin used in the present invention may be modified, e.g., may be esterified rosin, hydrogenated rosin, dimerized rosin, phenolic rosin, terpenic rosin, and the like. Suitable esterified rosins may be reaction products of rosin with mono-, di-, tri-, tetra-, polyfunctional alcohols or combinations thereof, including methyl alcohol, dipropylene glycol, glycerol, pentaerythritol, and combinations thereof. The rosin or rosin derivatives used in the present invention may be derived from any of the commercially available types of rosin such as wood rosin, gum rosin, tall oil rosin and mixtures thereof in their crude or refined state.

The oil may be a natural or a synthetic oil, but is preferably a natural oil, preferably a vegetable oil, which is optionally refined or modified, such as hydrogenated or partially hydrogenated, more preferably selected from the group consisting of rapeseed oil, refined rapeseed oil, sunflower oil and refined sunflower oil. By adding oil, the filler load of the composition can be increased, thereby reducing the amount of polymers required. Such polymers have a relatively high environmental impact. Increasing the amount of fillers that can be incorporated in the composition is highly beneficial as the filler has a relatively low environmental impact. The oil also acts as a plasticizer and softens the backing composition and makes the backing composition more flexible.

The filler may be any well-known filler, such as a mineral filler or an organic filler. Suitable types of fillers include calcium carbonate (limestone), silicates, silicas, oxides of silica, carbonates, sulfates, oxides of antimony, aluminium trihydrate, carbon black, talcum, clays, kaolin, wood flour and shell flour. The particle size of the fillers may range between about 0.01 μm and about 1 mm in size and may be segregated or classified to produce a desired mean size. In addition to these fillers also differently shaped fillers, biobased fillers and/or recycled fillers like wood chips, natural fibers, plant shells, plant residues, synthetic fibers, glass fibers, recycled fibers, recycled rubber, recycled plastic and other recycled materials can be incorporated into the composition taught herein.

In a preferred embodiment, the filler is limestone, preferably recycled limestone.

A thermoplastic elastomer may or may not be present in the backing composition taught herein. When present, the backing composition as taught herein preferably comprises from about 0.1% to about 5% (w/w) of the thermoplastic elastomer, such as about 0.20% to about 4.0% (w/w), about 0.30% to about 3.5% (w/w), and about 0.50% to about 3.0% (w/w).

The thermoplastic elastomer may be a so-called bitumen modifier. It may be a copolymer of ethylene and vinyl acetate (EVA), a block copolymer of polystyrene and polybutadiene (SBS), such as SBS having a styrene content between 10 and 70% (w/w), styrene-butadiene rubber (SBR), or other thermoplastic elastomers.

The thermoplastic elastomer can be an Ethylene-vinyl acetate (EVA). EVA is the copolymer of ethylene and vinyl acetate. The weight percent vinyl acetate may vary from 1 to 50%, such as from 10 to 40%, with the remainder being ethylene. It is a polymer with typical elastomeric properties in e.g. toughness and flexibility. The addition of a thermoplastic elastomer improves the elasticity and creep resistance of the backing composition. The bitumen modifiers or thermoplastic elastomers are generally mixed with the carpet backing at elevated temperatures (in general above 170° C.) and/or in a high shear mixer. Two common bitumen modifiers or thermoplastic elastomers available in the market are an SBS block copolymer (e.g. Kraton DSBS™ from Kraton) or an EVA elastomer (e.g. Polybilt 106™ from ExxonMobil).

In an embodiment, the thermoplastic elastomer may be a polyolefin polymer modifier, preferably a polyolefin which is commercially available, e.g. Exxon Mobile Vistamaxx™ granules.

In an embodiment, the thermoplastic elastomer may be a polyhydroxyalkanoate polymer modifier, preferably a polyhydroxyalkanoate, which is commercially available, e.g. Metabolix™, mirel granules.

In an embodiment, the backing composition further comprises between 0 and 2% of an anti-oxidant to prevent degradation of the backing composition with time. Non-limiting examples of suitable anti-oxidants include sterically hindered phenols, sterically hindered amines and phospites such as Irganox™ 1010 and Irgafos™ 168 from BASF, and Ethanox 310™ from SI Group.

In an embodiment, the carpet or carpet tile comprises a backing layer composed of a backing composition, said backing composition comprising:

(1) from about 5% to about 50% (w/w), preferably from about 6% to about 40% (w/w), more preferably from about 7% to about 35% (w/w), even more preferably from about 8% to about 32% (w/w), yet more preferably from about 9% to about 30% (w/w), such as from about 10% to about 28% (w/w) or from about 11% to about 25% (w/w), of a resin, such as rosin or a rosin derivative;

(2) from about 0.1% to about 20% (w/w), such as from about 0.1% to about 15% (w/w), from about 0.25% to about 11% (w/w), from about 0.5% to about 10% (w/w), from about 0.8% to about 8% (w/w), from about 1% to about 6% (w/w), from about 1.4% to about 5% (w/w), from about 1.8% to about 4% (w/w) of oil, such as a vegetable oil, e.g., rapeseed oil;

(3) from about 0% to about 10% (w/w), such as from about 0.1% to about 10% (w/w), from about 0.2% to about 9% (w/w), from about 0.3% to about 8% (w/w), from about 0.4% to about 6% (w/w), from about 0.5% to about 4% (w/w), or from about 0.75% to about 2.5% (w/w), of a thermoplastic elastomer; and (4) from about 50% to about 95% (w/w), such as from about 60% to about 94% (w/w), from about 70% to about 92% (w/w), from about 75% to about 90% (w/w), from about 75% to about 88% (w/w), from about 77% to about 86% (w/w), of a filler. The backing composition is typically applied onto the precoating layer of the precoated top cloth.

In a suitable embodiment, the backing composition taught herein comprises:

(1) from about 5% to about 50% (w/w), preferably from about 6% to about 40% (w/w), more preferably from about 7% to about 35% (w/w), even more preferably from about 8% to about 32% (w/w), yet more preferably from about 9% to about 30% (w/w), such as from about 10% to about 28% (w/w) or from about 11% to about 25% (w/w) rosin or a rosin derivative as taught herein;

(2) from about 0.1% to about 20% (w/w), such as from about 0.1% to about 15% (w/w), from about 0.25% to about 11% (w/w), from about 0.5% to about 10% (w/w), from about 0.8% to about 8% (w/w), from about 1% to about 6% (w/w), from about 1.4% to about 5% (w/w), from about 1.8% to about 4% (w/w) of a vegetable oil, e.g., rapeseed oil, which may optionally be refined;

(3) from about 0% to about 10% (w/w), such as from about 0.1% to about 10% (w/w), from about 0.2% to about 9% (w/w), from about 0.3% to about 8% (w/w), from about 0.4% to about 6% (w/w), from about 0.5% to about 4% (w/w), or from about 0.75% to about 2.5% (w/w), of an ethylene-vinyl acetate copolymer; and (4) from about 50% to about 95% (w/w), such as from about 60% to about 94% (w/w), from about 70% to about 920% (w/w), from about 75% to about 90% (w/w), from about 75% to about 88% (w/w), from about 77% to about 86% (w/w), of a filler, such as limestone.

The backing composition may be characterised by the softening point and the consistency of the material. The softening point is a measure of the impact of temperature on the material consistency. The softening point may be determined using any method known in the art, and can, for example, be determined in accordance with the method described in EN1427:2007—Bitumen and bituminous binders—Determination of the softening point—Ring and Ball method. The consistency of the material under specified conditions of temperature, load and loading duration may be determined using any method known in the art, and can, for example, be measured in accordance with EN 1426:2007—Bitumen and bituminous binders—Determination of needle penetration. The consistency, also known as needle penetration, is expressed as the distance in tenths of a millimetre that a standard needle will penetrate into the material.

In a suitable embodiment, the backing composition is characterised by having a Ring and Ball softening point, preferably as determined conform EN1427:2007, in the range of 60-180° C., preferably 70-160° C., more preferably 75-140° C., even more preferably, 80-120° C., and/or a needle penetration at 25° C., preferably as determined conform EN1426:2007, in the range of 0.2-200×0.1 mm, such as 0.5-100×0.1 mm, 0.8-75×0.1 mm, or 1-50×0.1 mm.

The produced carpet may be classified conform EN1307-2014: Textile floor coverings—Classification. This European Standard specifies the requirements for classification of all textile floor coverings and carpet tiles, excluding rugs and runners (see ISO 2424) into use classes with regard to one or more of the following properties: wear, appearance retention, additional performance properties and classes for luxury rating.

The invention also relates to a method for preparing a carpet or carpet tile as taught herein, said method comprising the steps of:

providing a precoated top cloth comprising a top side comprising yarn or fibers and a back side comprising a precoating layer as taught herein;

preparing a backing composition as taught herein; and applying said backing composition onto said precoating layer.

A precoated top cloth may be prepared by applying a precoating layer onto a textile top cloth, as taught above.

Optionally, other layers are added before, during or after the application of the backing composition, including, without limitation, a glass veil, glass scrim, foam layer, nonwoven covering fleece, etc.

The backing composition taught herein may be prepared by mixing the individual components of said backing composition into a composition in a molten state. This will usually occur at an elevated temperature, such as between 120 and 200° C. This backing composition may then be formed into a sheet-like structure using any method known in the art, and may then be applied onto the back side (side comprising the precoating layer) of the precoated top cloth to thereby form a backing layer. A glass veil or scrim may be incorporated into the backing layer for dimensional stability using any method known in the art. Two or more backing layers may be applied, for example, to allow for another layer, like e.g. a foam layer, glass veil or glass scrim to be added in between said two or more backing layers. At the external surface side of the backing layer a covering fleece, like a polypropylene nonwoven, may be added to prevent sticking on or fouling of the floor.

EXAMPLES

The following backing composition was prepared without thermoplastic elastomer:

| | |
|---|---|
| Limestone filler | 82.0% (w/w) |
| Rosin Glycerol ester | 15.2% (w/w) |
| Refined sunflower oil-high oleic | 2.8% (w/w) |

The softening point of the backing composition as measured using EN1427:2007 was 94° C. The needle penetration at 25° C. of the backing composition as measured using EN1426:2007 was 10.9×0.1 mm. The binder in the backing composition had a bio-based content of 100%.

This backing composition was mixed in a z-blade mixer in one step at a temperature between 140° C. and 150° C.

The following backing composition was prepared with thermoplastic elastomer:

| | |
|---|---|
| Limestone filler | 82.0% (w/w) |
| Rosin glycerol ester | 14.3% (w/w) |
| Refined rapeseed oil | 2.3% (w/w) |
| Ethylene-vinyl acetate (EVA) with 24% vinylacetate content | 1.4% (w/w) |

The softening point of the backing composition as measured using EN1427:2007 was 100° C. The needle penetration at 25° C. of the backing composition as measured using EN1426:2007 was 2.5×0.1 mm. The binder in the backing composition had a bio-based content of 92%.

The individual components of the backing composition with thermoplastic elastomer were mixed together into a backing composition in two steps:

Step 1:

In the first step a premix was made in which all the EVA granulate was mixed into a part of the limestone/rosin/rapeseed oil mixture in a heated kneader at 185° C. This step was carried out to provide enough shear and temperature for the EVA to be mixed well with the other components. This resulted in a premix with the following composition:

| | |
|---|---|
| Limestone filler | 72.4% (w/w) |
| Rosin glycerol ester | 12.7% (w/w) |
| Refined rapeseed oil | 6.0% (w/w) |
| Ethylene-vinyl acetate (EVA) with 24% vinylacetate content | 8.9% (w/w) |

Step 2:

In the second step the remaining parts of the limestone, rosin and rapeseed oil were mixed together with the premix at 160° C. in a standard heated mixing vessel to obtain the end composition of the backing composition.

This backing composition was then formed into a sheet-like structure and applied on the precoating layer of a precoated top cloth at a temperature of about 160° C. In this case a tufted loop-pile carpet was used. A glass veil or scrim was incorporated into the backing layer for dimensional stability. At the external surface of the backing layer a covering fleece was added to prevent sticking on or fouling of the floor. Finally the carpet was cut into carpet tiles.

The produced tufted loop-pile carpet tiles passed the criteria for use class 33: heavy commercial use conform EN1307-2014: Textile floor coverings—Classification. The emissions measurements showed that this backing had low emissions and was suitable for a carpet that needs to pass the strict gemeinschaft umweltfreundlicher teppichboden (GUT) carpet emission requirements as described in: GUT product test 2010: Emission limit values chamber test in $\mu g/m^3$. The backing does not contain any substances that are subject to the ban on use or have limit values as described in the GUT list of pollutants and is therefore suitable for a carpet that needs to pass the strict GUT requirements on pollutants.

The use of biobased materials reduced the impact that the carpet backing has on global warming. The carbon present in the natural resin and oil is sequestered from $CO_2$ present in the air. When the product is incinerated, possibly with a waste to energy application, then the sequestered $CO_2$ is released back into the air and no extra $CO_2$ is produced.

The invention claimed is:

1. A carpet or carpet tile comprising a textile top cloth, a precoating layer and a backing layer, wherein the backing layer comprises a backing composition, wherein the backing composition comprises:

a rosin or a derivative thereof;

a non-fossil natural oil which is optionally refined, hydrogenated, or partially hydrogenated;

optionally, a thermoplastic elastomer; and a filler, wherein the non-fossil natural oil is present in the backing composition in an amount from about 0.1 to about 4% (w/w), wherein the filler is present in the backing composition in an amount from about 60 to about 95% (w/w), wherein the thermoplastic elastomer is present in the backing composition in an amount from 0 to about 4% (w/w), wherein when the thermoplastic elastomer is present, the thermoplastic elastomer comprises a copolymer of ethylene and vinyl acetate (EVA), a block copolymer of polystyrene and polybutadiene (SBS) or a polyhydroxyalkanoate, and wherein the backing composition is devoid of a polyolefin polymer.

2. The carpet or carpet tile according to claim 1, wherein the non-fossil natural oil comprises a plant, animal, or algae derived oil.

3. The carpet or carpet tile according to claim 1, wherein the non-fossil natural oil comprises a vegetable oil.

4. The carpet or carpet tile according to claim 3, wherein the vegetable oil comprises rapeseed oil, refined rapeseed oil, sunflower oil, refined sunflower oil, or refined high oleic sunflower oil.

5. The carpet or carpet tile according to claim 1, wherein the thermoplastic elastomer is present, and wherein the thermoplastic elastomer comprises the copolymer of ethylene and vinyl acetate or the block copolymer of polystyrene and polybutadiene (SBS).

6. The carpet or carpet tile according to claim 5, wherein the thermoplastic elastomer comprises the copolymer of ethylene and vinyl acetate.

7. The carpet or carpet tile according to claim 1, wherein the filler comprises at least one of calcium carbonate, silicates, silicas, oxides of silica, carbonates, sulfates, oxides of antimony, aluminum trihydrate, carbon black, talcum, clays, or kaolin.

8. The carpet or carpet tile according to claim 1, wherein the filler comprises an organic filler comprising wood chips, wood flour, shell flour, plant material, or a recycled material.

9. A carpet or carpet tile comprising a textile top cloth, a precoating layer, and a backing layer, wherein the backing layer comprises a backing composition, wherein the backing composition consists of a particulate filler present in the backing composition in an amount from about 60 to about 95% (w/w) and a bio-based binder, the bio-based binder comprising a rosin or a derivative thereof;

an unmodified non-fossil natural oil; and optionally, a thermoplastic elastomer (TPE), wherein the unmodified non-fossil natural oil is present in the backing composition in an amount from about 0.1 to about 4% (w/w), wherein when the thermoplastic elastomer is present, the thermoplastic elastomer comprises a copolymer of ethylene and vinyl acetate (EVA), a block copolymer of polystyrene and polybutadiene (SBS), a polyhydroxyalkanoate, or a polyolefin, and wherein when the TPE comprises the polyolefin, the polyolefin is present in the backing composition in a concentration from about 0.1% to about 3% (w/w).

10. The carpet or carpet tile of claim 9, wherein the thermoplastic elastomer is present, and wherein the thermoplastic elastomer comprises at least one of a copolymer of ethylene and vinyl acetate, a block copolymer of polystyrene and polybutadiene (SBS), or a polyhydroxyalkanoate.

11. A method for preparing the carpet or carpet tile according to claim 1, the method comprising the steps of:

providing the textile top cloth, wherein the textile top cloth comprises a top side comprising yarn or fibers and a back side comprising the precoating layer;

preparing the backing composition comprising the rosin or the derivative thereof, the non-fossil natural oil which is optionally refined or modified, the optional thermoplastic elastomer; and the filler; and applying the backing composition onto the precoating layer.

* * * * *